United States Patent
Cortes Turcios

[11] Patent Number: 5,158,515
[45] Date of Patent: Oct. 27, 1992

[54] ENTERTAINING EXERCISE APPARATUS

[76] Inventor: Roberto A. Cortes Turcios, Miguel Aleman No. 485, Col. Gabilondo, Tijuana Baja California, C.P. 22410,

[21] Appl. No.: 747,860
[22] Filed: Aug. 20, 1991
[51] Int. Cl.⁵ .............................................. A63B 22/06
[52] U.S. Cl. .......................................... 482/57; 482/66
[58] Field of Search ............... 280/282, 239, 62, 28 R, 280/20 S, 266, 287; 272/33 B, 70.3, 73; 180/280

[56] References Cited

U.S. PATENT DOCUMENTS

| | | | |
|---|---|---|---|
| D. 290,451 | 6/1987 | Engum | 280/282 |
| 2,548,749 | 9/1948 | Stout | 280/282 |
| 3,438,649 | 1/1967 | Schermerhorn | 280/282 |
| 4,093,260 | 6/1978 | Terzian | 280/282 |
| 4,176,851 | 12/1979 | Simonson | 280/287 |
| 4,417,743 | 11/1982 | Garel | 280/282 |
| 4,674,762 | 6/1987 | Nelson | 280/282 |
| 4,711,447 | 12/1987 | Mansfield | 273/73 |

FOREIGN PATENT DOCUMENTS 1364860 8/1974 United Kingdom ............ 280/282

*Primary Examiner*—Richard J. Apley
*Assistant Examiner*—Jerome Donnelly
*Attorney, Agent, or Firm*—Albert O. Cota

[57] ABSTRACT

An entertaining exercise apparatus that allows a user to be entertained while performing a muscular and aerobic exercise. The apparatus consists of a circular tubular structure (1) that has attached to its upper surface a crankset (4) having a pair of pedals that are operated by the user sitting on a seat (6). In front of the seat is located a fork (11) that includes an adjustable handlebar (13). To the lower surface of the tubular structure is located a primary wheel (18) and a pair of secondary wheels (19). The primary wheel is rotated by a rotating shaft (16) that is made to rotate by a chain (17) that is operated by the pedal driven crankset (4). The three wheels are located equidistant from each other so that the apparatus can rotate or spin on its vertical axis without any horizontal movement. The apparatus is designed to be easily disassembled so that it can be conveniently stored and transported.

4 Claims, 2 Drawing Sheets

ENTERTAINING EXERCISE APPARATUS

TECHNICAL FIELD

The invention pertains to the general field of exercising apparatuses and more particularly to a bicycle-type exerciser that allows the user to rotate the apparatus while performing a muscular and aerobic exercise.

BACKGROUND OF THE INVENTION

Manufacturers of exercising and sporting equipment are continuously in search of new exercising apparatuses that concurrently entertain while the exercise is being performed.

Today there are numerous and traditional apparatuses being marketed such as bicycles, skates and scooters. These moving apparatuses provide a dual function: they entertain when in use and they develop various skills and physical abilities. Stationary exercise equipment, such as the stationary bicycle exerciser in particular, has undergone various improvements and modifications by both manufacturers and independent inventors. These improvements and modifications have included mechanical changes, the addition of ergonomic features and digital readouts that provide pulse rate and speed data. However, the addition of an entertainment feature has not been addressed. Although the stationary bicycle exerciser has been in use for many years, a rotating bicycle-type exerciser that rotates while performing an exercise was not found.

A search of the prior art did not disclose any patents that read directly on the claims of the instant invention however, the following U.S. patents were considered related:

| U.S. Pat. No. | INVENTOR | ISSUED | |
|---|---|---|---|
| 323,289 | Blount | 28 July 1885 | — |
| 359,127 | Brusie | 8 March 1887 | |
| 2,646,990 | Fowler | 28 July 1953 | |
| 4,746,135 | Oh | 24 May 1988 | |
| 4,746,136 | Kirk | 24 May 1988 | |

U.S. Pat. No. 323,289 discloses a bicycle with an auxiliary bicycle supporting wheel adapted so that it can be attached to the front fork and aligned with the bicycle's main wheel.

U.S. Pat. No. 359,127 discloses a device called "headers" that prevents the user from being thrown forward when the bicycle stops suddenly.

U.S. Pat. No. 2,646,990 discloses how a structure in the shape of an animal, such as a horse, can be adapted to fit over the main elements of a bicycle.

U.S. Pat. No. 4,746,135 discloses a pedal crank driven tricycle. The tricycle includes a frame having a seat supporting a driver, a front wheel and two rear wheels. The pedal crank, which is supported by the frame, is connected to the rear axle by two crank rods that alternately rotate the axle which in turn, rotates the wheels.

U.S. Pat. No. 4,746,136 discloses a bicycle frame that includes a saddle-stem and a head interconnected by upper and lower bars. The saddle stem, the upper bar and part of the lower bar are integrally cast in a light metal.

In the prior art, there are numerous fixed and stationary exercising apparatuses. Generally the users of these apparatuses, such as stationary bicycle exercisers, do not find them entertaining since all the user does is pedal, Additionally, most stationary exercising equipment is designed to be used indoors in one location therefore, they are not easily transportable.

The instant invention with its unique entertaining and exercising concept, provides an apparatus with three wheels which on pedaling, spins on its own vertical axis. Thus, making it appropriate for the entertainment of people of all ages while at the same time allowing an exercise to be performed within a relatively small flat surface located indoors or outdoors.

DISCLOSURE OF THE INVENTION

The entertaining exercise apparatus consists of a circular tubular structure having attached to its upper side, a crankset with pedals, a seat and a handlebar which can be adjusted to accommodate the height and size of the user. To the bottom of the tubular structure is attached a pair of free-wheeling secondary wheels and a power driven primary wheel. The wheels are located so that the angle between them allows the apparatus to spin on its own vertical axis with little or no horizontal movement. The primary wheel is joined to a rotating power shaft which receives its momentum from the crankset through a chain drive or some other transmission mechanism.

In the preferred embodiment, a user sitting on the seat, which is attached to the top part of the apparatus, applies force to the crankset by means of the pedals. The resulting momentum is transmitted to the rotating shaft via a chain and a pair of connecting chainwheels. Thus, causing the primary wheel to rotate which in turn, causes the apparatus to begin its spinning motion without moving horizontally. The parts of the apparatus are joined in such a way that they can easily be taken apart for packing, storing and transporting.

In view of the above disclosure, it is the primary object of the invention to provide an entertaining exercise apparatus that can be easily used by both children and adults.

In addition to the primary object it is also an object of the invention to provide an apparatus that:
 can be adjusted to accommodate the user's size,
 can be used both indoors and outdoors and in a relatively small flat surface,
 is reliable and easily maintainable, and
 is cost-effective from both a manufacturers and consumers point of view.

BEST MODE FOR CARRYING OUT THE INVENTION

The best mode for carrying out the invention is presented in terms of a preferred embodiment that is designed to allow the user of the apparatus to be entertained while performing a muscular and aerobic exercise.

Figure 1:
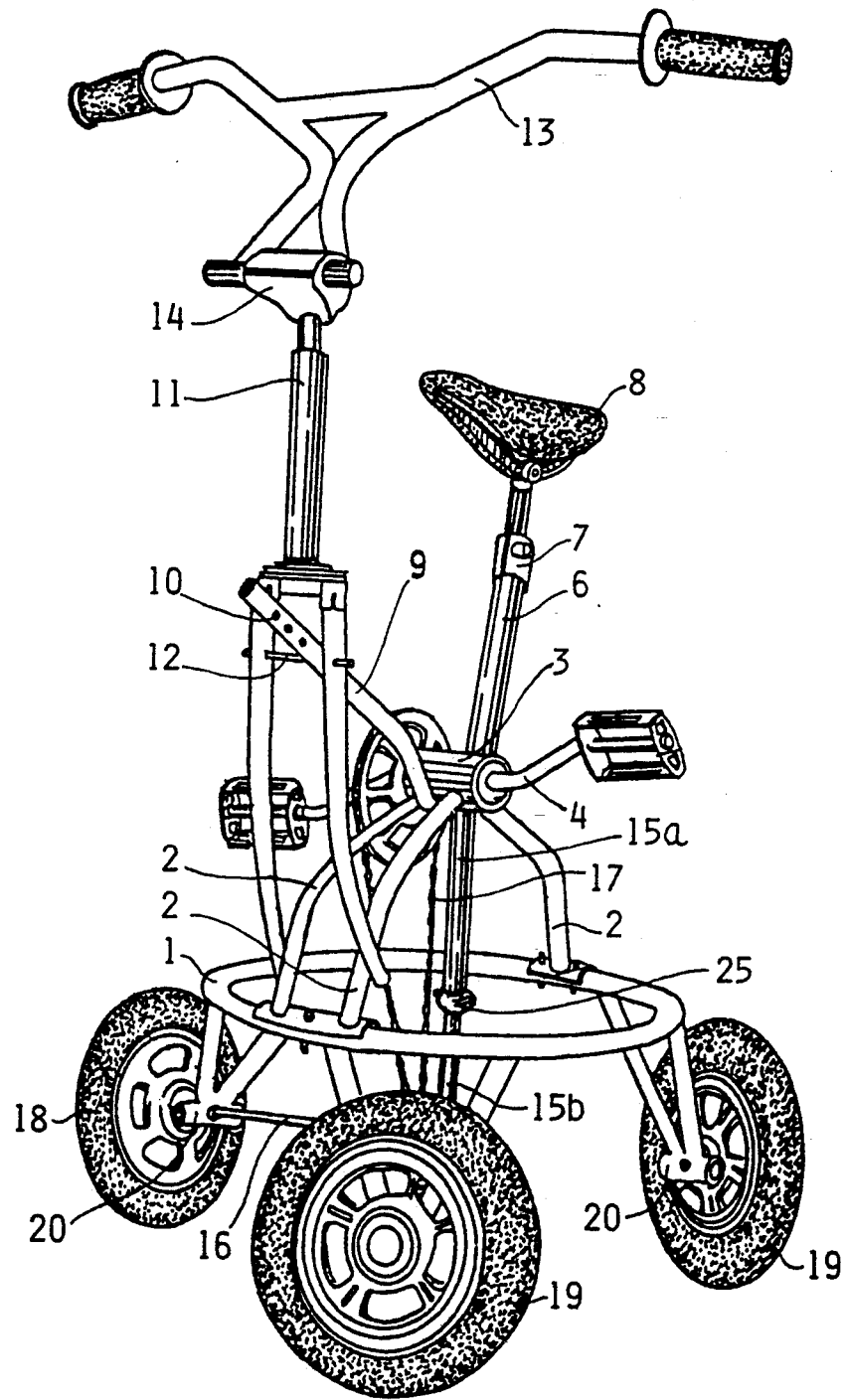
FIG. 1 is a perspective view of the entertaining exercise apparatus.
Figure 2:
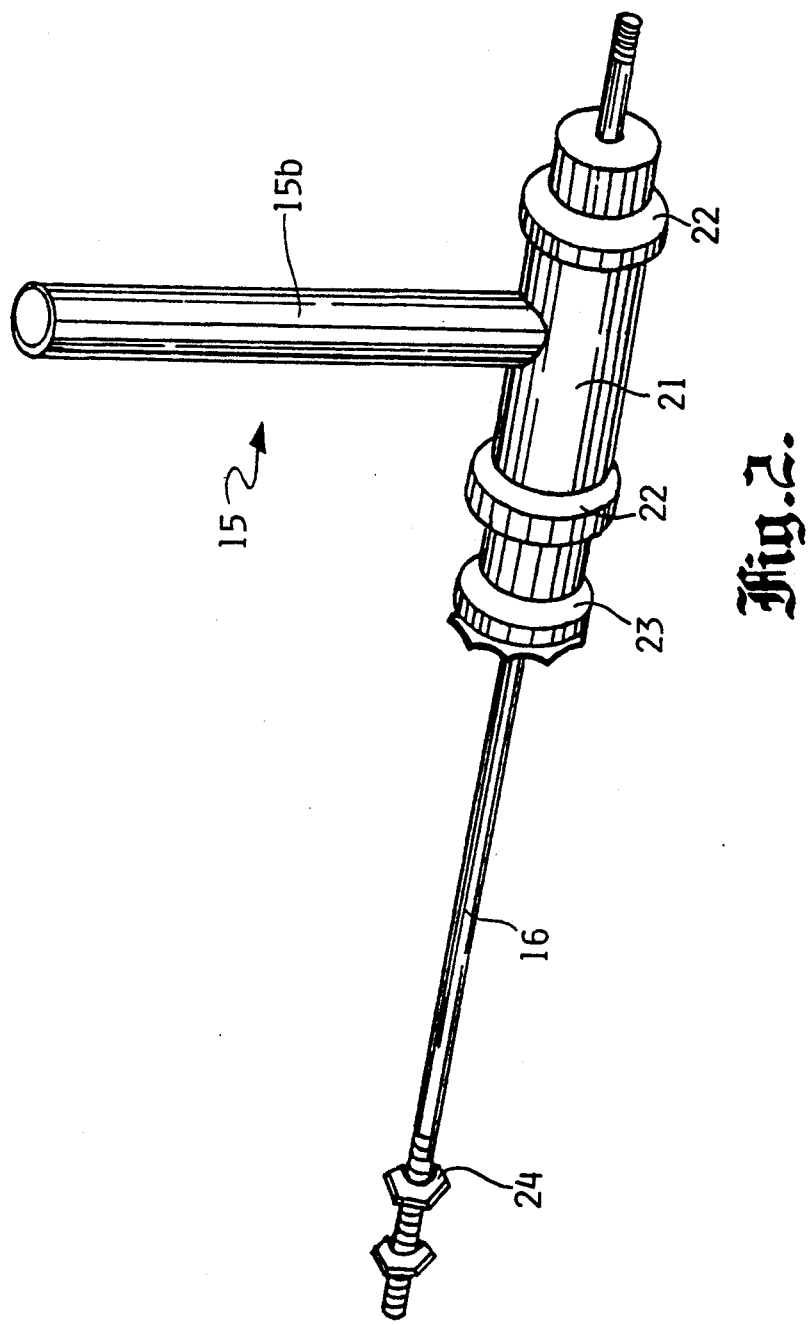
FIG. 2 is a partial view of the momentum transmission section showing how the rotating shaft is attached to the primary wheel.

The preferred embodiment of the apparatus as shown in FIGS. 1 and 2, is comprised of the following elements: a tubular support structure 1, a set of vertical supports 2, a bottom bracket assembly 3 that includes a crankset 4 having a pair of pedals and a primary chainwheel 5, a seat sleeve 6, a seat clamp 7, a seat 8, an adjustable fork member 9, a set of fork adjustment bores 10, a fork 11, a fork adjustment pin 12, a handlebar 13, a handlebar adjustment sleeve 14, a vertical support tube 15, a rotating shaft 16, a chain 17, a primary wheel 18, a pair of secondary wheels 19, three wheel axle supports 20, a rotating shaft support 21, a pair of connecting sections 22, a secondary chainwheel 23, primary wheel support nuts 24 and a set of clamps 25.

The horizontal tubular support structure 1 can be made in any geometrical shape but is preferably circular as shown in FIG. 1. The structure has three vertical supports 2 that are attached to the upper surface of the tubular structure by means of screws and nuts or any other fastening method. Two of the supports are placed towards the front of the tubular structure 1 and the other towards the back. All three structures curve upwardly towards the center and are attached to the lower section of the bottom bracket assembly 3. The function and construction of the bottom bracket assembly 3 is well known as it is similar to the bottom bracket assemblies used on traditional bicycles.

The bottom bracket assembly 3, a hollow tubular member, serves as the support for the crankset 4 and the pedals, and includes a primary chainwheel 5. The chainwheel transmits momentum by means of the chain 17 that is looped around the primary chainwheel 5 and the secondary chainwheel 23 located on the bottom section of the apparatus as shown in FIG. 2. The supports 2 also provide support for the seat sleeve 6 that extends upwardly and has a fastening device or seat clamp 7 at its top end that is used to attach and adjust the height of the seat 8.

The fork 11 is conventionally attached to the lower portion of the front supports 2 by means of nuts and bolts that allow the fork 11 to be adjusted. The fork 11 includes an upwardly extending sleeve and is kept in the desired position by means of a combination consisting of an adjustable fork member 9 and an adjustment lock pin 12 as shown in FIG. 1. The adjustable fork member 9 is joined to the upper part of the front vertical supports 2 and contains a plurality of adjustment bores 10 that allow the member 9 to be selectively moved to adjust the fork's position. The handlebar 13 which is similar to a conventional bicycle handlebar, is inserted into the fork's sleeve and its forward and backward position is adjusted and fixed by the handlebar clamp 14.

The lower part of the entertaining exercise apparatus comprises one primary wheel 18 and at least two freewheeling secondary wheels 19. All three wheels are placed axially to the vertical axis of the apparatus, form a tangent to the point where they are connected and are placed equidistant from each other which allows the apparatus to spin on its own vertical axis. The three wheels are each joined to their respective position on the tubular structure 1 by means of a wheel axle support 20. This support is preferably made of two solid pieces welded together to form a "V" shape and includes a horizontal section placed at a tangent with the point of union with the tubular structure 1 and that has a bore therethrough. The secondary wheels are rotatably attached to their respective horizontal sections by means of an axle fastened by a nut and bolt combination as shown in FIG. 1.

With reference to FIGS. 1 and 2, the rotating shaft 16 that drives the primary wheel 18 receives the momentum transmitted by the chain 17 via the secondary chainwheel 23. The rotating shaft 16, as best shown in FIG. 2, is rotatably held within a rotating shaft support 21 by means of two connecting sections 22. The connecting section that faces the primary wheel 18, has attached the secondary chainwheel 23. The opposite connecting section 22 is used to hold a threaded shaft that when tightened by a nut maintains the tubular section 21 intact.

The primary wheel 18 is attached to the rotating shaft 16 that has been inserted into the bore on its respective horizontal section by means of two nuts 24 that tighten against a ball bearing housing on the primary wheel 18. The ball bearings allow the wheel 18 to continue rotating after the user stops pedaling and the shaft 16 has stopped rotating. By having the wheel continue with its rotation after the axle stops rotating, prevents a sudden braking action that could cause the user to fall off the apparatus.

The rotating shaft support 21 is attached to the lower side of the bottom bracket assembly 3 by means of a vertical support tube 15 that consists of two tubes having different diameters. The tube with the largest diameter 15a extends downwardly from the bottom bracket 3 and contains a clamp 25 located at the height of the plane formed by the tubular structure 1. To the other side of the clamp 25 is connected the tube with the shortest diameter 15b that is directly attached to the short tubular element 21. The joining or connecting techniques makes it possible for the apparatus to be easily taken apart for packing, storing and transporting.

OPERATION

To operate the entertaining and exercise apparatus the user:

A. sits on the seat 8,
B. leans on the handlebar 13 and
C. begins pedaling to move the crankset 4 which then allows the apparatus to begin a stationary spin at a speed proportional to the force applied to the crankset 4 by the user.

The apparatus can be made to spin in any direction depending on the crankset system used. Additionally, the apparatus may include a conventional braking system (not shown) that allows the user to stop a spin at any time. The apparatus can also be constructed to include a pair of seats making it possible for two persons to use the apparatus.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

I claim:

1. Entertaining exercise apparatus comprising a circular tubular support structure having attached to its upper surface a set of three vertical supports where two said supports are attached to the front and one said support is attached to the back of said tubular support structure, where to the upper ends of said vertical supports is attached to a bottom bracket assembly, a seat and a fork that supports a handlebar, where said bottom bracket assembly includes a crankset that transmit the momentum produced by a user to the lower part of said apparatus by means of a transmission mechanism that operates a rotating shaft, where below said tubular structure are connected at least three wheel axle supports spaced an equal distance from each other wherein said supports function to attach a primary wheel, that is rotated by said rotating shaft, and at least two free-wheeling secondary wheels. Tangent to said circular frame and said tubular structure and axial to the vertical axis of said apparatus so as to allow said apparatus to rotate or spin on its vertical axis with relatively no horizontal movement.

2. An entertaining exercise apparatus comprising a circular tubular support structure having attached to its upper surface a set of three vertical supports where two said supports are attached to the front and one said support is attached to the back of said tubular support structure, where to the upper ends of said vertical supports is attached a bottom bracket assembly, a seat and a fork that supports a handlebar, where said fork includes an adjustment means that allows the distance from said seat to the handlebar to be adjusted, said means comprising, an adjustable fork member and an adjustment lock pin, where said fork member is joined to the upper part of said front vertical supports and contains a plurality of adjustment bores into which said lock pin is inserted when the desired position has been selected, where said bottom bracket assembly includes a crankset that transmits the momentum produced by a user to the lower part of said apparatus by means of a transmission mechanism that operates a rotating shaft, where below said tubular structure are located at least three wheel axle supports, spaced an equidistance from each other wherein said supports function to attach a primary wheel that is rotated by said rotating shaft and at least two free-wheeling secondary wheels, tangent to said circular frame and axial to the vertical axis of said apparatus, so as to allow said apparatus to rotate or spin on its vertical axis with relatively no horizontal movement.

3. An entertaining exercise apparatus comprising:
a) a tubular structure located in a horizontal plane,
b) a set of three vertical supports where two said supports are attached to the front and one said support is attached to the back of said tubular structure,
c) a bottom bracket assembly that is supported by said set of vertical supports, where said assembly comprises a primary chainwheel and a crankset having attached a pair of pedals, where said primary chainwheel rotates when said pedals are operated by a user,
d) a fork adjustably attached to the lower portion of said vertical supports that are attached to the front of said tubular structure, with said fork having an upwardly extending sleeve,
e) a handlebar adjustably attached to the upwardly extending sleeve on said fork,
f) a seat adjustably attached to a seat sleeve attached to said set of vertical supports,
g) a primary wheel and a pair of secondary wheels were all three wheels are spaced equidistant from each other and are attached to said tubular structure, tangent to said circular frame and axial to vertical axis of said apparatus, by means of a respective wheel axle support, so as to allow said apparatus to rotate or spin on its vertical axis with relatively no horizontal movement, and
h) a rotating shaft support located below said tubular structure and having a vertical support tube that is attached to said bottom bracket, where said rotating shaft support includes a rotating shaft that is attached to a secondary chainwheel that is driven by a chain looped around said primary chainwheel and that rotates when said pedals are moved by the user, where said rotating shaft is attached to said primary wheel via the respective wheel axle support.

4. The apparatus as specified in claim 3 wherein said bottom bracket is a hollow tubular member.

* * * * *